United States Patent [19]
Kolthammer et al.

[11] Patent Number: 5,763,547
[45] Date of Patent: Jun. 9, 1998

[54] SUPPORTED CATALYST COMPLEXES FOR OLEFIN IN POLYMERIZATION

[75] Inventors: Brian W. S. Kolthammer; John C. Tracy; Robert S. Cardwell, all of Lake Jackson; Robert K. Rosen, Sugar Land, all of Tex.

[73] Assignee: The Dow Chemical Company, Midland, Mich.

[21] Appl. No.: 626,303

[22] Filed: Apr. 1, 1996

Related U.S. Application Data

[60] Continuation-in-part of Ser. No. 457,383, Jun. 1, 1995, abandoned, which is a division of Ser. No. 439,069, May 11, 1995, abandoned, which is a division of Ser. No. 138,069, Oct. 18, 1993, abandoned, which is a continuation-in-part of Ser. No. 955,600, Oct. 2, 1992, abandoned.

[51] Int. Cl.$^6$ ............................................. C08F 4/643
[52] U.S. Cl. .................. 526/129; 526/130; 526/133; 526/160; 526/943; 502/103; 502/120; 502/117; 502/128
[58] Field of Search ................... 526/129, 130, 526/133, 160, 943; 502/103, 120, 128, 117

[56] References Cited

U.S. PATENT DOCUMENTS

| | | |
|---|---|---|
| 3,645,992 | 2/1972 | Elston . |
| 4,076,698 | 2/1978 | Anderson et al. . |
| 4,302,565 | 11/1981 | Goeke et al. . |
| 4,302,566 | 11/1981 | Karol et al. . |
| 4,303,771 | 12/1981 | Wagner et al. . |
| 4,395,359 | 7/1983 | Wagner et al. . |
| 4,405,495 | 9/1983 | Lee et al. . |
| 4,481,301 | 11/1984 | Nowlin et al. . |
| 4,522,982 | 6/1985 | Ewen . |
| 4,542,199 | 9/1985 | Kaminsky et al. . |
| 4,544,762 | 10/1985 | Kaminsky et al. . |
| 4,562,169 | 12/1985 | Hagerty et al. . |
| 4,798,081 | 1/1989 | Hazlitt et al. . |
| 4,808,561 | 2/1989 | Welborn, Jr. . |
| 4,935,397 | 6/1990 | Chang . |
| 4,937,301 | 6/1990 | Chang . |
| 5,015,749 | 5/1991 | Schmidt et al. . |
| 5,026,798 | 6/1991 | Canich . |
| 5,041,584 | 8/1991 | Crapo et al. . |
| 5,041,585 | 8/1991 | Deavenport et al. . |
| 5,055,438 | 10/1991 | Canich . |
| 5,057,475 | 10/1991 | Canich et al. . |
| 5,064,802 | 11/1991 | Stevens et al. . |
| 5,066,631 | 11/1991 | Sangokoya ................ 502/152 |
| 5,086,024 | 2/1992 | Crapo ....................... 502/117 |
| 5,096,867 | 3/1992 | Canich . |
| 5,132,380 | 7/1992 | Stevens et al. . |
| 5,321,106 | 6/1994 | LaPointe ................... 526/126 |

FOREIGN PATENT DOCUMENTS

| | | |
|---|---|---|
| 129368 | 12/1984 | European Pat. Off. . |
| 260999 | 3/1988 | European Pat. Off. . |
| 277004 | 8/1988 | European Pat. Off. . |
| 416815 | 3/1991 | European Pat. Off. . |
| 418044 | 3/1991 | European Pat. Off. . |
| 420431 | 4/1991 | European Pat. Off. . |
| 423100 | 4/1991 | European Pat. Off. . |
| 468651 | 1/1992 | European Pat. Off. . |
| 514828 | 11/1992 | European Pat. Off. . |
| 520732 | 12/1992 | European Pat. Off. . |
| 9104257 | 4/1991 | WIPO . |
| 9109882 | 7/1991 | WIPO . |
| 9114713 | 10/1991 | WIPO . |
| 9200333 | 1/1992 | WIPO . |

OTHER PUBLICATIONS

J. Am. Chem. Soc (113) 8570–1 (1991).
Randall, *Rev. Macromoal. Chem. Phys.*, C29 (2&3), pp. 285–297, (1989).
M. Shida et al., *Polymer Engineering Science*, vol. 17, No. 11, "Correlation of Low Density Polyethylene Rheological Measurements with Optical and Processing Properties" pp. 769–774 (1977).
John Dealy, *Rheometers for Molten Plastics*, Van Nostrand Reinhold Co., pp. 97–99, (1989).
Ramamurthy, *Journal of Rheology*, "Wall Slip Viscous Fluids and Influence of Materials of Construction" John Wiley & Sons, 30 (2), pp. 337–357, (1986).
John Dealy, *Rheometers for Molten Plastics*, Van Nostrand Reinhold Co., pp. 250–251, (1982).
Wild et al., *Journal of Polymer Science, Poly. Phys. Ed.*, "–Determination of Branching Distributions in Polyethylene and Ethylene Copolymers" John Wiley & Sons, vol. 20, p. 441 (1982).
Williams & Word in *Journal of Polymer Science, Polymer Letters*, vol. 6, p. 621 1968.
Chien et al. J. Pol. Sci., Part A vol. 26, p. 2639 (1987).
Marks et al. 113 J. Am. Chem. Soc. 3623–5 (1991).

*Primary Examiner*—Mark Nagumo

[57] ABSTRACT

A supported catalyst composition comprising a complex of a Group 4 metal cyclopentadienyl derivative reacted with silica treated with an aluminoxane demonstrates improved reactivity, especially for incorporating long chain alpha-olefins and also shows improved resistance to catalyst poisoning. The supported catalyst composition is adapted to produce homogeneous polymers, copolymers, terpolymers, etc., for example, homogeneous polyethylene, homogeneous poly(ethylene-octene) copolymers and the like. The invention further includes the process of preparing the supported catalyst compositions and a process for preparing olefinic polymers using these catalyst compositions.

11 Claims, No Drawings

SUPPORTED CATALYST COMPLEXES FOR OLEFIN IN POLYMERIZATION

CROSS REFERENCE TO RELATED APPLICATIONS

This application is a continuation-in-part of U.S. application Ser. No. 08/457,383 filed Jun. 1, 1995 (now abandoned), which is a division of U.S. application Ser. No. 08/439,069 filed May 11, 1995, (now abandoned) which is a divisional a application Ser. No. 08/138,069 filed Oct. 18, 1993 (now abandoned) which is a continuation-in-part of U.S. application Ser. No. 07/955,600 filed Oct. 2, 1992 (now abandoned). This application is also related to U.S. application Ser. No. 07/401,344 filed Aug. 31st, 1989, U.S. application Ser. No. 07/545,403 filed Jul. 3rd, 1990, U.S. application Ser. No. 07/720,041 filed Jun. 24th, 1991, U.S. application Ser. No. 07/758,654 filed Sept. 12th, 1991, U.S. application Ser. No. 07/758,660 filed Sept. 12th, 1991, U.S. application Ser. No. 07/817,202, filed Jan. 6th, 1992, and U.S. application Ser. No. 07/857,886, filed Mar. 26th, 1992, the entire specifications of which are incorporated herein by reference.

DOCUMENTS INCORPORATED BY REFERENCE

The following documents, each of which is discussed below, are incorporated herein by reference.

U.S. Pat. Nos.: 4,522,982; 4,544,762; 4,808,561; 4,935,397; 4,937,301; 5,015,749; 5,026,798; 5,041,584; 5,041,585; 4,542,199; 5,055,438; 5,057,475; 5,064,802; and 5,096,867.

European Patent Publications Nos.: 0 129 368, published Dec. 27th, 1984; 0 260 999 published Mar. 23rd, 1988; 0 277 004, published Aug. 3rd, 1988; 0 416 815 published Mar. 13th, 1991; and 0 420 431 published Apr. 3rd, 1991. International Patent Publications: WO 91/04257, published Apr. 4th, 1991; WO 91/14713, published Oct. 3rd, 1991; WO 91/09882, published Jul. 11th, 1991; and WO 92/00333, published Jan. 9th, 1992.

Publications: Marks, et al., *J. Am. Chem. Soc.*, volume 113, 3623–3625, (1991), Chien, et al., *Journal of Polymer Science*, Part A, volume 26, page 2639 (1987); and Williams and Ward, *Journal of Polymer Science*, Polymer Letters, Vol. 6, 621, (1968).

BACKGROUND OF THE INVENTION

1. Field of the Invention

The invention relates to compositions of matter which are useful as supported catalysts for vinyl addition polymerization, as well as methods for preparing these catalysts, and a process of polymerizing alpha-olefins using these catalysts. More particularly, the invention relates to a three-component catalyst complex comprising (a) an organometallic complex, (b) a compound or complex other than an aluminoxane which converts the organometallic complex into a cationic complex, and (c) an inert support comprising silica reacted with an aluminoxane, the catalyst complex useful for making ethylene polymers and copolymers.

2. Technology Review

The modern methods of catalyzing the polymerization of alpha-olefins using a transition metal catalyst were first generally described by Ziegler, Natta and by researchers at Phillips Petroleum. Although highly improved polymerization methods have been developed over the course of time, these catalysts still produce heterogeneous type polymers; that is, the polymerization reaction product is a complex mixture of polymers with a relatively wide distribution of molecular weights. This wide distribution of molecular weights has an effect on the physical properties of the polymer which, depending upon the ultimate use of the polymer, can prove to be an advantage or a disadvantage.

The molecular weight distribution (MWD), or polydispersity, is a known variable in polymers which is described as the ratio of weight average molecular weight (Mw) to number average molecular weight (Mn) (i.e., Mw/Mn), parameters which can be measured directly, for example by gel permeation chromatography techniques. For some polymers, the MWD has also been approximated by the $I_{10}/I_2$ ratio (also known as the melt flow ratio). The melt index, or $I_2$, is measured according to ASTM D-1238 Condition 190/2.16 (formerly known as Condition E). The high load melt index, or $I_{10}$ is measured according to ASTM D-1238 Condition 190/10 (formerly known as Condition F). The $I_{10}/I_2$ ratio is also an indicator of the shear sensitivity and processibility for ethylene polymers. Low density polyethylenes (LDPE) typically have a higher $I_{10}/I_2$ ratio than linear low density polyethylenes (LLDPE) or ultra low density polyethylenes (ULDPE) and are easier to melt process in fabrication equipment.

Recently, ethylene polymers having a narrow MWD were introduced. These polymers were produced using a so-called "single site catalyst." The physical properties of the polymers were alleged to be good, but, unfortunately, since these polymers are linear, it appears that they had a low melt elasticity and were difficult to process with conventional melt fabrication equipment. The problems are manifested, for example, in their lack of ability to sustain a bubble in a blown film process, and by a "sag" when evaluated in blow molding process. In addition, the melt fracture surface properties of these polymers were unacceptable even at relatively low extrusion rates, a feature that makes them undesirable for use in equipment operating at the current high speed (i.e., production rates).

In WO 91/09882, published Jul. 11th, 1991, it has been reported that single-site metallocene-alumoxane catalysts produce polymers of generally lower molecular weight and comonomer incorporation than desired. The application further reports that it would be desirable to support cationic complexes without the use of an alumoxane or alkyl aluminium cocatalyst.

Certain cationic catalysts are known which have excellent catalytic activity but unfortunately they are undesirably sensitive to polar impurities which act as catalyst poisons. Such impurities may be contained in the olefin monomers, the polymerization mixture, or even the polymerization reactor. When the polar impurities are present, the catalyst lifetimes have been limited and the molecular weights of the resulting polymers have been reduced. Thus, special handling is required to eliminate such polar impurities.

Various techniques have been tried to overcome the low polymerization activities of the catalysts. For example, trialkylboron, trialkylaluminium and aluminoxane compounds have been employed to remove catalyst poisons from biscyclopentadienyl-containing olefin polymerization catalysts. Such adjuvants are only partially effective in combating the inhibition or poisoning of the cationic catalysts and they may actually interfere with the desired catalytic polymerization process. For example, in *J. Am. Chem. Soc.* 113, 8570–8571 (1991), it has been reported that the use of aluminoxanes in combination with biscyclopentadienyl-containing cationic olefin polymerization catalysts results in the detrimental interference with the catalyst for propylene polymerizations.

Accordingly, there is a need for new or improved organometallic catalyst compositions, particularly supported catalyst compositions, that are resistant to the effects of polar impurities and other catalyst poisons, and therefore have extended catalyst lifetimes and improved polymerization efficiencies.

There is also a need for an olefin polymerization catalyst that can be used to more efficiently and effectively copolymerize ethylene with higher alpha-olefins, e.g. alpha-olefins having 3 to 20 carbon atoms. In practice, the commercial copolymers are made using monomers having 3 to 8 carbon atoms (i.e., propylene, butene-1, hexene-1, octene-1 and 4-methyl-1-pentene) because of the low rate of reactivity and incorporation of the alpha-olefins with larger carbon chains. The traditional Ziegler catalysts are not efficient or effective in incorporating the longer chain comonomers into the polymer. The rate of reaction for the ethylene monomer is much greater than the rate of reaction for the higher alpha-olefin monomers in the copolymerization reaction using traditional Ziegler catalysts. Accordingly, due to the lower reaction rate of incorporating the longer chain comonomer into the growing polymer chain, the copolymer fractions containing the longer chain comonomers are generally the lower molecular weight fractions with limited physical properties.

Even in the most current olefin copolymerization systems, there is still a need for an olefin polymerization catalyst which is able to efficiently incorporate a large degree of longer chain olefins into a copolymer chain and give a polymeric product which has a narrow molecular weight distribution and is homogeneous with respect to branching. The properties and advantages of homogeneous copolymers are described in U.S. Pat. No. 3,645,992.

In EP 0 416 815, published Mar. 13th, 1991, there are disclosed certain constrained geometry complexes comprising a strain-inducing delocalized pi-bonded moiety and metals of Groups 4 to 10 of the Periodic Table of the Elements. Such compositions formed catalysts in the presence of activating cocatalysts such as methylaluminoxane, aluminum alkyls, aluminum halides, aluminum alkylhalides, Lewis acids, ammonium salts, non-interfering oxidizing agents, and mixtures of the foregoing.

In U.S. patent application Ser. No. 07/758,660 and U.S. patent application Ser. No. 07/758,654 (corresponding to EP 0 418 044, published Mar. 29th, 1991), certain cationic derivatives of the foregoing constrained geometry catalysts are disclosed as olefin polymerization catalysts. In U.S. patent application Ser. No. 07/720,041, certain borane derivatives of the forgoing constrained geometry olefin polymerization catalysts are disclosed as is a method for their preparation.

Additionally, there is a need for new or improved organometallic catalyst compositions which can be used in either gas-phase olefin polymerization reactions, slurry olefin polymerization reactions or solution olefin polymerization reactions. Of additional importance, it is apparent to those skilled in the art, that a commercially suitable catalyst should maintain catalytic activity for long periods of time to allow for storage and transportation. Few if any metallocene or single-site catalysts previously disclosed have met these requirements. In particular, for slurry or gas-phase polymerization processes, the morphology, particle size and bulk density of the polymer particle require a solid component polymerization catalyst.

Patents and publications which reflect the technology of vinyl addition polymerization, particularly with respect to olefin polymerization, include U.S. Pat. Nos.: 4,808,561; 4,935,397; 4,937,301; 4,522,982; 5,026,798; 5,057,475; 5,055,438; 5,064,802; 5,096,867; European Patent Publication Nos.: 0 129 368, published Dec. 27th, 1984; 0 260 999 published Mar. 23rd, 1988; 0 277 004, published Aug. 3rd, 1988; 0 416 815 published Mar. 13th, 1991; 0 420 431 published Apr. 3rd, 1991; and International Patent publication Nos.: WO 91/04257, published Apr. 4th, 1991; WO 91/14713, published Oct. 3rd, 1991; WO 91/09882, published Jul. 11th, 1991; and WO 92/00333, published Jan. 9th, 1992.

The present invention provides new and advantageous supported catalyst complexes, new and advantageous supports for catalyst complexes, a process for preparing these new supports, a process for preparing the supported catalyst complexes, and a process for polymerizing olefins using these new supported catalyst complexes. The new and advantageous supports are prepared by contacting silica with an aluminoxane, preferably either methylaluminoxane or modified methylaluminoxane. The new and advantageous supported catalyst complexes combine these supports with a variety of organometallic catalyst complexes including, for example, constrained geometry catalyst complexes and metallocene catalysts. Olefins may be advantageously polymerized using these new supported catalyst complexes, especially ethylene homopolymers and copolymers. Long chain olefins may also be advantageously copolymerized with short chain olefins using these new supported catalyst complexes. Additionally, the new supported catalyst complexes are useful in solution polymerization, slurry polymerization and gas-phase polymerization of olefins.

SUMMARY OF THE INVENTION

The supported organometallic catalyst compositions of the present invention are three-component catalyst systems comprising (a) an organometallic complex which can be converted to a cationic form, (b) a compound or complex other than an aluminoxane which can convert the organometallic complex to its cationic form, and (c) an inert catalyst support in contact with the organometallic complex of (a) and the compound or complex of (b), the support comprising silica which has been reacted with an aluminoxane, e.g. methylaluminoxane or a modified methylaluminoxane.

More particularly, the supported organometallic catalyst composition adapted for homopolymerizing of ethylene or copolymerizing ethylene with at least one C3 to C20 α-olefin monomer to form an ethylene polymer having a narrow molecular weight distribution (e.g., Mw/Mn less than 4) comprises:

(a) an organometallic complex of the formula:

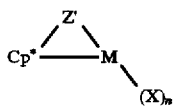

wherein:

M is a metal of Group 4 of the Periodic Table of the Elements,

Cp* is a cyclopentadienyl group bound in an $\eta^5$ bonding mode to M or such a cyclopentadienyl group substituted with from one to four substituents selected from the group consisting of hydrocarbyl, silyl, germyl, halo, hydrocarbyloxy, amine, and mixtures thereof, said substituent having up to 20 nonhydrogen atoms, or optionally, two substituents together cause Cp* to have a fused ring structure;

Z' is a divalent moiety other than a cyclopentadienyl group or substituted cyclopentadienyl groups, said Z' comprising boron, or a member of Group 14 of the Periodic Table of the Elements, and optionally nitrogen, phosphorus, sulfur or oxygen, said moiety having up to 20 nonhydrogen atoms, and optionally Cp* and Z' together form a fused ring system;

X independently each occurrence is an anionic ligand group having up to 50 non-hydrogen atoms and X is not a cyclopentadienyl or substituted cyclopentadienyl group; and n is 1 or 2 depending on the valence of M;

(b) a compound or complex other than an aluminoxane which converts the organometallic complex (a) into a cationic complex of the formula:

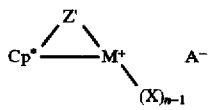
(II)

wherein:

Cp*, Z', M, X, and n are as defined with respect to the formula of the organometallic complex in (a) above, and A⁻ is a monovalent, noncoordinating, compatible anion, and (c) an inert, catalyst support in contact with the organometallic complex of (a) and the compound or complex of (b), said catalyst support comprising silica reacted with an aluminoxane.

It is an advantage of the present invention that the supported organometallic catalyst compositions are resistant to the effects of catalyst poisons.

It is another advantage of the present invention that the supported organometallic catalyst compositions have extended catalyst lifetimes and improved polymerization efficiencies, particularly with respect to polymerization of long chain olefin monomers.

It is further an advantage of the present invention that the improved, supported organometallic catalyst compositions provide copolymers, particularly polyolefin copolymers, terpolymers, etc., that have a narrow molecular weight distribution (e.g., Mw/Mn less than 4).

It is yet another advantage of the present invention that the supported organometallic catalyst compositions, when used in a continuous polymerization process, especially a continuous solution polymerization process, as described in U.S. Pat. No. 5,272,236 (the disclosure of which is incorporated herein by reference), permit the efficient incorporation of long chain monomers, particularly higher alpha-olefin monomers, into olefinic polymers such that the distribution of long chain monomers in the resulting polymer is homogeneous with respect to both the molecular weight distribution and the distribution of comonomers in the polymer chain.

It is yet an additional advantage of the present invention that the novel supported organometallic catalyst compositions are not restricted to any particular polymerization process, but can be used in gas-phase polymerization, slurry polymerization or solution polymerization of olefins.

DEFINITIONS

"Periodic Table"—All reference to the Periodic Table of the Elements herein refers to the *Periodic Table of the Elements*, published and copyrighted by CRC Press, Inc., 1989.

"Group" or "Groups"—Any references to a Group or Groups shall be to the Group or Groups as reflected in the Periodic Table of Elements using the IUPAC system for numbering groups of elements.

"MAO"—all references refer to methylaluminoxane.

"MMAO"—all references refer to modified methylaluminoxane.

"Non-coordinating anion"—all references refer to an anion that does not complex or coordinate with the organometallic complex of component (a), described below, or which is only weakly coordinated therewith, thus remaining sufficiently labile to be displaced by a neutral Lewis base. A non-coordinating, compatible anion specifically refers to a compatible anion which, when functioning as a charge balancing anion in the catalyst complex of the invention, does not transfer an anionic substituent or fragment thereof to the cationic species of of the organometallic complex of (a) in the formula above thereby forming a neutral four coordinate metallocene and a neutral metal by-product.

"Activated catalyst composition"—all references refer to a composition comprising (a) an organometallic complex, (b) a compound or complex other than an aluminoxane which converts the organometallic complex of (a) into a cationic complex, and (c) an inert catalyst support in contact with both the organometallic complex of (a) and the compound or complex of (b), the composition producing under polymerization conditions ethylene homopolymers and homogeneous copolymers of ethylene and α-olefin(s) with a narrow molecular weight distribution.

"Homogeneous copolymer"—all references refer to copolymers comprising ethylene and at least one α-olefin in which the distribution of the α-olefin(s) is random along the backbone of any given copolymer molecule, and in which the α-olefin(s) content of one copolymer molecule is substantially the same as the α-olefin content of the other copolymer molecules.

"Other than an aluminoxane"—use of this phrase in the description of the compound or complex of (b) above specifically contemplates the use of aluminoxane in the preparation of the inert catalyst support of (c), and means that the aluminoxane used in the preparation of this support is ineffective to convert the organometallic complex of (a) into the cationic complex of (b).

"Ziegler catalyst"—all references refer to a catalyst, usually a chemical complex derived from a transition metal halide and a metal hydride or a metal alkyl. These catalysts usually operate at atmospheric or low pressure and may be used to polymerize ethylene to linear polyethylene.

DETAILED DESCRIPTION OF THE INVENTION

The supported organometallic catalyst compositions of this invention produce under polymerization conditions an ethylene homopolymer or a homogeneous copolymer of ethylene and at least one α-olefin (both the homopolymer and the copolymer of narrow molecular weight distribution), and generally comprise the reaction product of:

(a) an organometallic complex of the formula:

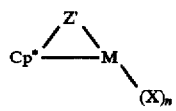
(I)

wherein:

M is a metal of Group 4 of the Periodic Table of the Elements,

Cp* is a cyclopentadienyl group bound in an $\eta^5$ bonding mode to M or such a cyclopentadienyl group substituted with from one to four substituents selected from the group consisting of hydrocarbyl, silyl, germyl, halo, hydrocarbyloxy, amine, and mixtures thereof, said substituent having up to 20 nonhydrogen atoms, or optionally, two substituents together cause Cp* to have a fused ring structure;

Z' is a divalent moiety other than a cyclopentadienyl group or substituted cyclopentadienyl groups, said Z' comprising boron, or a member of Group 14 of the Periodic Table of the Elements, and optionally nitrogen, phosphorus, sulfur or oxygen, said moiety having up to 20 nonhydrogen atoms, and optionally Cp* and Z' together form a fused ring system;

X independently each occurrence is an anionic ligand group having up to 50 non-hydrogen atoms and X is not a cyclopentadienyl or substituted cyclopentadienyl group; and n is 1 or 2 depending on the valence of M;

(b) a compound or complex other than an aluminoxane which converts the organometallic complex (a) into a cationic complex of the formula:

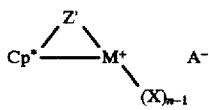
(II)

wherein:

Cp*, Z', M, X, and n are as defined with respect to formula (I) of the organometallic complex in (a) above, and $A^{31}$ is a monovalent, noncoordinating, compatible anion, and (c) an inert, catalyst support in contact with the organometallic complex of (a) and the compound or complex of (b), said catalyst support comprising silica reacted with an aluminoxane.

Suitable organometallic complexes for use herein preferably include constrained geometry complexes, one species of which are also known as bridged monocyclopentadienyl metal complexes. Examples of such complexes and methods for their preparation are disclosed in U.S. application Ser. No. 07/401,344, filed Aug. 31, 1989, pending U.S. application Ser. No. 07/545,403, filed Jul. 3, 1990 (EP-A-416,815); U.S. application Ser. No. 07/547,718, filed Jul. 3, 1990 (EP-A-468,651); U.S. application Ser. No. 07/702,475, filed May 20, 1991 (EP-A-514,828); pending U.S. application Ser. No. 967,365 filed Oct. 28, 1992 and pending U.S. application Ser. No. 07/876,268, filed May 1, 1992, (EP-A-520,732), as well as U.S. Pat. Nos. 5,055,438, 5,057,475, 5,096,867, 5,064,802, 5,132,380, 5,321,106 and 5,374,696, all of which are incorporated herein by reference.

The foregoing complexes may be further described as comprising a metal coordination complex, CG, comprising a metal, M, of Group 4 of the Elements and a delocalized π-bonded moiety substituted with a constrain-inducing moiety, said complex having a constrained geometry about the metal atom, and provided further that for such complexes comprising more than one delocalized, substituted π-bonded moiety, only one thereof for each metal atom of the complex is a cyclic, delocalized, substituted π-bonded moiety.

Examples of delocalized π-bonded moieties include Cp* as defined hereinafter, as well as delocalized allyl or diene groups. Examples of constrain inducing moieties include —Z'— or —Z—Y— as defined hereinafter; as well as difunctional hydrocarbyl or silyl groups.

Also, it should be noted that the complex may exist as a dimer or higher oligomer. A neutral Lewis base, such as an ether or amine compound, may also be associated with the complex, if desired, however, such is generally not preferred.

Preferred metal coordination complexes correspond to the formula:

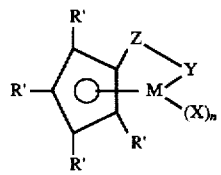
(III)

wherein R' each occurrence is independently selected from the group consisting of hydrogen, alkyl, aryl, silyl and combinations thereof having up to 20 non-hydrogen atoms or two R' groups together a fused ring;

X each occurrence independently is selected from the group consisting of hydride, halo, alkyl, aryl, silyl, germyl and combinations thereof having up to 20 non-hydrogen atoms;

Y is a divalent ligand group comprising nitrogen, phosphorus, oxygen or sulfur and having up to 20 non-hydrogen atoms, said Y being bonded to Z and M through said nitrogen, phosphorus, oxygen or sulfur, and optionally Y and Z together form a fused ring system;

M is a Group 4 metal, especially titanium;

Z is SiR*$_2$, CR*$_2$, SiR*$_2$SiR*$_2$, CR*$_2$CR*$_2$, CR*=CR*, CR*$_2$SiR*$_2$, or BR*; wherein:

R* each occurrence is independently selected from the group consisting of hydrogen, alkyl, aryl, silyl and mixtures thereof, or both R* groups from Z, or from Z' together with Y form a ring system; and n is 1 or 2.

Further preferably, Y is —O—, —S—, —NR*,—, or —PR*—. Highly preferably Y is a nitrogen or phosphorus containing group corresponding to the formula —N(R')— or —P(R')— wherein R' is as previously defined.

More preferred metal coordination complexes correspond to the formula:

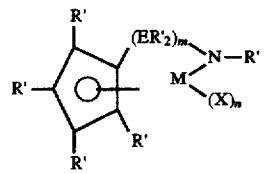
(IV)

wherein:

M is titanium and is bound to the cyclopentadienyl group;

R' each occurrence is independently selected from the group consisting of hydrogen, silyl, alkyl, aryl and combinations thereof having up to 10 carbon or silicon atoms, or two R' groups together form a fused ring with the cyclopentadienyl group;

E is silicon or carbon;

X independently each occurrence is hydride, halo, alkyl, aryl, aralkyl, aryloxy or alkoxy of up to 10 carbons;

m in is 1 or 2; and n is 1 or 2.

Examples of the above most highly preferred metal coordination complexes include complexes wherein the R' on the amido group is methyl, ethyl, propyl, butyl, pentyl, hexyl, (including all isomers of said propyl, butyl, pentyl, hexyl groups), norbornyl, benzyl, phenyl, etc.; the cyclopentadienyl group is cyclopentadienyl, indenyl, tetrahydroindenyl, fluorenyl, octahydrofluorenyl, etc.; R' on the foregoing cyclopentadienyl groups each occurrence is hydrogen, methyl, ethyl, propyl, butyl, pentyl, hexyl, (including isomers), norbornyl, benzyl, phenyl, etc.; and X is chloro, bromo, iodo, methyl, ethyl, propyl, butyl, pentyl, hexyl, (including isomers), norbornyl, benzyl, phenyl, etc.

Specific highly preferred complexes include: (t-butylamido)(tetramethyl-$\eta^5$-cyclopentadienyl)-1,2-ethanediyltitanium dimethyl, (t-butylamido) (tetramethyl-$\eta^5$-cyclopentadienyl)-1,2-ethanediyltitanium dibenzyl, (t-butylamido)(tetramethyl-$\eta^5$-cyclopentadienyl) dimethylsilanetitanium dimethyl, (t-butylamido) (tetramethyl-$\eta^5$-cyclopentadienyl)dimethylsilanetitanium dibenzyl, (methylamido)(tetramethyl-$\eta^5$-cyclopentadienyl) dimethylsilanetitanium dimethyl, (methylamido) (tetramethyl-$\eta^5$-cyclopentadienyl)dimethylsilanetitanium dibenzyl, (phenylamido)(tetramethyl-$\eta^5$-cyclopentadienyl) dimethylsilanetitanium dimethyl-, (phenylamido) (tetramethyl-$\eta^5$-cyclopentadienyl)dimethylsilanetitanium dibenzyl-, (benzylamido)(tetramethyl-$\eta^5$-cyclopentadienyl) dimethylsilanetitanium dimethyl-, (benzylamido) (tetramethyl-$\eta^5$-cyclopentadienyl)dimethylsilanetitanium dibenzyl-, (t-butylamido) ($\eta^5$-cyclopentadienyl)-1,2-ethanediyltitanium dimethyl, (t-butylamido)($\eta^5$-cyclopentadienyl)-1,2-ethanediyltitanium dibenzyl, (t-butylamido)($\eta^5$-cyclopentadienyl) 1,2-ethanediyltitanium dibenzyl, (t-butylamido)($\eta^5$-cyclopentadienyl) dimethylsilanetitanium dimethyl, (t-butylamido)($\eta^5$-cyclopentadienyl)dimethylsilanetitanium dibenzyl, (methylamido)($\eta^5$-cyclopentadienyl)dimethylsilanetitanium dimethyl, (t-butylamido)($\eta^5$-cyclopentadienyl) dimethylsilanetitanium dibenzyl, (t-butylamido)($\eta^5$-indenyl)dimethylsilanetitanium dimethyl, (t-butylamido) ($\eta^5$-indenyl)dimethylsilanetitanium dibenzyl, (benzylamido)($\eta^5$-indenyl)dimethylsilanetitanium dibenzyl; and the corresponding zirconium or hafnium coordination complexes.

The complexes may be prepared by contacting a metal reactant of the formula: $MX_{t-2}X'_2$ wherein M and X are as previously defined in formula I, t is equal to the valence state of the metal, and X' is a suitable leaving group, especially halo or alkoxy, with a double Group I metal derivative or double Grignard derivative of a compound which is a combination of the delocalized π-bonding group having the constrain inducing moiety, especially D-Cp-Z'-D, where D is the Group I metal or Grignard, attached thereto. The reaction is conducted in a suitable solvent and the salt or other byproduct is separated. Suitable solvents for use in preparing the metal complexes are aliphatic or aromatic liquids such as cyclohexane, methylcyclohexane, pentane, hexane, heptane, tetrahydrofuran, diethyl ether, benzene, toluene, xylene, ethylbenzene, etc., or mixtures thereof. This technique is described in EP-A-416,815.

Ionic, active catalyst species, which are formed by combining (a) as defined above and (b) as defined herein, preferably corresponding to the formula:

wherein:

$CG^+$ is a cationic derivative of the previously defined metal coordination complex;

$A^{d-}$ is a noncoordinating, compatible anion having a charge of d, and d is an integer from 1 to 3.

Preferred ionic catalyst complexes correspond to the formula:

wherein:

Cp*, Z', M, X, and n are as defined with respect to formula I, and $A^{31}$ is a monovalent, noncoordinating, compatible anion.

More highly preferred ionic catalyst complexes correspond to the formula:

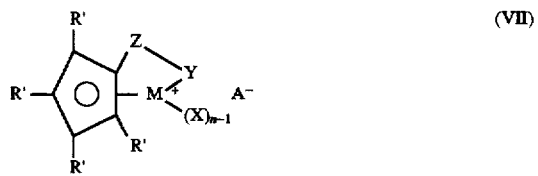

wherein:

R', Z, Y, M, X, and n are as defined with respect to formula III, and $A^{31}$ is a monovalent, noncoordinating, compatible anion.

Most highly preferred ionic catalyst complexes correspond to the formula:

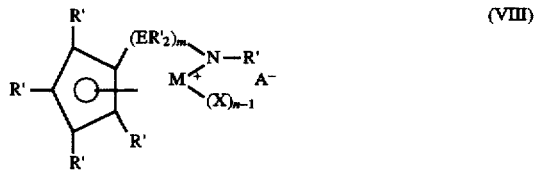

wherein:

R', E, M, N, m and n are as defined with respect to formula IV, and $A^{31}$ is a monovalent, noncoordinating, compatible anion.

One method of making these ionic catalyst complexes involves combining:

$a_1$) the previously disclosed metal coordination complex containing at least one substituent which will combine with the cation of a second component, and $b_1$) at least one second component which is a salt of a Bronsted acid and a noncoordinating, compatible anion.

More particularly the noncoordinating, compatible anion of the Bronsted acid salt may comprise a single, nonnucleophilic, coordination complex comprising a charge-bearing core of aluminum, boron, or phosphorus.

Preferred metal complexes for the foregoing reaction are those containing at least one hydride, hydrocarbyl or substituted hydrocarbyl group. The reaction is conducted in an inert liquid such as $C_{5-10}$ alkanes, or toluene.

Compounds useful as a second component (b) in the foregoing preparation of the ionic catalyst complexes in step $b_1$) will comprise a cation, which is a Bronsted acid capable of donating a proton, and the anion $A^-$. Preferred anions are those containing a single coordination complex comprising a negative charge bearing core which anion is capable of stabilizing the active catalyst species (the metal cation) which is formed when the two components are combined. Also, said anion should be sufficiently labile to be displaced by olefinic, diolefinic and acetylenically unsaturated compounds or other neutral Lewis bases such as ethers, nitrites and the like. Compounds containing anions which comprise coordination complexes containing a single core atom are, of course, well known and many, particularly such compounds containing a single boron atom in the anion portion, are available commercially. In light of this, salts containing anions comprising a coordination complex containing a single boron atom are preferred.

One class of compounds that can be used as the second component useful in this preparation of the ionic catalysts used in this invention may be represented by the following general formula:

$$(L-H)_{d+}[A]^{d-} \tag{IX}$$

wherein:

L is a neutral Lewis base;

$(L-H)^{30}$ is a Bronsted acid; and $A^{d+}$ is as previously defined.

More preferably $A^{d-}$ corresponds to the formula:

$$[M^{m'+}Q_n']^{d-} \tag{X}$$

wherein:

m' is an integer from 1 to 7;

n' is an integer from 2 to 8;

d=n'−m';

M' is an atom selected from Group 4 of the Periodic Table of the Elements; and

Q independently each occurrence is selected from the Group consisting of hydride, dialkylamido, halide, alkoxide, aryloxide, hydrocarbyl, and substituted-hydrocarbyl radicals of up to 20 carbons with the proviso that in not more than one occurrence is Q halide.

Another and preferred class of compounds that can be used as the second components which are useful in the preparation of catalysts of this invention comprise boron and may be represented by the following general formula:

$$[L-H]^+[BQ'_4]^- \tag{XI}$$

wherein:

L is a neutral Lewis base;

$[L-H]^+$ is a Bronsted acid;

B is boron in a valence state of 3; and

Q' is a $C_{1-20}$ fluorinated hydrocarbyl group. Most preferably, Q' is each occurrence a perfluorinated aryl group, especially pentafluorophenyl.

Illustrative, but not limiting, examples of boron compounds which may be used as a second component in the preparation of the improved catalyst complexes of this invention are trialkyl ammonium salts or triaryl ammonium salts such as: trimethylammonium tetraphenylborate, N,N-dimethylanilinium tetraphenylborate, trimethylammonium tetrakis(perfluorophenyl)borate, triethylammonium tetrakis(perfluorophenyl)borate, tripropylammonium tetrakis(perfluorophenyl)borate, tri(n-butyl)ammonium tetrakis(perfluorophenyl)borate, tri(t-butyl)ammnonium tetrakis(perfluorophenyl)borate, N,N-dimethylanilinium tetrakis(perfluorophenyl)borate, N,N-diethylanilinium tetrakis(perfluorophenyl)borate, N,N-(2,4,6-pentamethyl)anilinium tetrakis(perfluorophenyl)borate, trimethylammonium tetrakis(2,3,4,6-tetrafluorophenyl)borate, N,N-dimethylanilinium tetrakis(2,3,4,6-tetrafluorophenyl)borate, N,N-(2,4,6-pentamethyl)anilinium tetrakis(2,3,4,6-tetrafluorophenyl)borate, and the like; dialkyl ammonium salts such as di(i-propyl)ammonium tetrakis (perfluorophenyl)borate, dicyclohexylammonium tetrakis (perfluorophenyl)borate, dicyclohexylammonium tetrakis (perfluorophenyl)borate and the like; and triaryl substituted phosphonium salts such as triphenylphosphonium tetrakis (perfluorophenyl)borate, tri(otolyl)phosphonium tetrakis (perfluorophenyl)borate, tris(2,6-dimethylphenyl) phosphonium tetrakis(perfluorophenyl)borate, and the like.

Another technique for preparing the ionic complexes involves combining:

a₂) the previously disclosed metal coordination complex (first component); and b₂) at least one second component which is a salt of a carbenium group and the previously disclosed noncoordinating, compatible anion, $A^{31}$.

A third technique for preparing the ionic complexes is an abstraction technique involving combining:

a₃) the previously disclosed metal coordination complex (first component); and

₃) a Lewis acid having sufficient Lewis acidity to cause abstraction of an anionic ligand of the metal coordination complex thereby forming a cationic derivative thereof.

Preferred metal coordination complexes for the foregoing abstraction reaction are those containing at least one hydride, hydrocarbyl or substituted hydrocarbyl group able to be abstracted by the Lewis acid. A preferred Lewis acid is tris(perfluorophenyl)borane. This technique is more fully disclosed in the previously mentioned U. S. Ser. No. 876, 268, filed May 1, 1992, (EP-A-520,732) the teachings of which were incorporated by reference.

Ionic complexes resulting from the latter abstraction technique have a limiting charge separated structure corresponding to the formula:

$$CG^+(XZ)^- \tag{XII}$$

wherein:

CG' is the derivative formed by abstraction of an X group from the metal complex, which is as previously defined in it broadest, preferred and most preferred embodiments;

X is the anionic ligand abstracted from the metal coordination complex; and

Z is the remnant of the Lewis acid. Preferably X is $C_1$–$C_{10}$ hydrocarbyl group, most preferably methyl.

Formula XII is referred to as the limiting, charge separated structure. However, it is to be understood that, particularly in solid form, the catalyst complex may not be fully charge separated. That is, the X group may retain a partial covalent bond to the metal atom, M. Thus, the catalyst complexes may be alternately depicted as possessing the formula:

$$CG''..X..Z \tag{XIII}$$

wherein CG" is the partially charge separated CG group.

Component (c) of the invention is conveniently made by reacting silica, i.e. $SiO_2$, and an aluminoxane. This component surprisingly serves both as a support and as an integral, nonactivating part of the catalyst complex and catalytic process of the invention.. In general, the $SiO_2$ of component (c) is preferably a porous, fine particulate having a large surface area. Nevertheless, the particle size of the $SiO_2$ of component (c) will depend on whether the three-component catalyst is to be used in a gas-phase polymerization process, a slurry polymerization process, or a solution polymerization process.

Preferably, for use in an olefin polymerization process, the $SiO_2$ of component (c) has a porosity of from about 0.2 to about 1.5 cc/g, more preferably from about 0.3 to about 1.2 cc/g, and most preferably from about 0.5 to about 1.0 cc/g, each being a measure of the mean pore volume as determined by the BET technique using nitrogen as a probe molecule.

Preferably, for use in a gas-phase olefin polymerization process, the $SiO_2$ of component (c) has an mean particle diameter from about 20 microns to about 200 microns, more preferably from about 30 microns to about 150 microns and most preferably from about 50 microns to about 100 microns, each as measured by sieve analysis.

Preferably, for use in a slurry olefin polymerization process, the $SiO_2$ of component (c) has an mean particle diameter from about 1 microns to about 150 microns, more preferably from about 5 microns to about 100 microns and most preferably from about 20 microns to about 80 microns, each as measured by sieve analysis.

Preferably, for use in a solution olefin polymerization process, the $SiO_2$ of component (c) has an mean particle diameter from about 1 microns to about 40 microns, more preferably from about 2 microns to about 30 microns and most preferably from about 3 microns to about 20 microns, each as measured by sieve analysis.

The silica of component (c) is preferably dehydroxylated prior to reaction with aluminoxane. Dehydroxylation may be accomplished by any suitable means known in the art. A preferred means for the dehydroxylation reaction is heating of a silica powder in a fluidized bed reactor, under conditions well known to those skilled in the art. Most preferably, conditions are chosen such that the silica is substantially completely dehydroxylated prior to reaction with aluminoxane but, it should be recognized that the silica need not be completely dehydroxylated.

The aluminoxane of component (c) is of the formula $(R^4_x(CH_3)_yAlO)_n$, wherein $R^4$ is a linear, branched or cyclic $C_1$ to $C_6$ hydrocarbyl, x is from 0 to about 1, y is from about 1 to 0, and n is an integer from about 3 to about 25, inclusive. The preferred aluminoxane components, referred to as modified methylaluminoxanes, are those wherein $R^4$ is a linear, branched or cyclic $C_3$ to $C_9$ hydrocarbyl, x is from about 0.15 to about 0.50, y is from about 0.85 to about 0.5 and n is an integer between 4 and 20, inclusive; still more preferably, $R^4$ is isobutyl, tertiary butyl or n-octyl, x is from about 0.2 to about 0.4 , y is from about 0.8 to about 0.6 and n is an integer between 4 and 15, inclusive. Mixtures of the above aluminoxanes may also be employed in the practice of the invention.

Most preferably, the aluminoxane of component (c) is of the formula $(R^4_x(CH_3)_yAlO)_n$, wherein $R^4$ is isobutyl or tertiary butyl, x is about 0.25, y is about 0.75 and n is from about 6 to about 8.

Particularly preferred aluminoxanes are so-called modified aluminoxanes, preferably modified metlhylaluminoxanes (MMAO), that are completely soluble in alkane solvents, for example heptane, and include very little, if any, trialkylaluminum. A technique for preparing such modified aluminoxanes is disclosed in U.S. Pat. No. 5,041,584. Aluminoxanes useful in preparing component (c) of invention may also be made as disclosed in U.S. Pat. Nos. 4,542,199; 4,544,762;, 5,015,749; and 5,041,585.

Component (c) may be readily made by the reaction of $SiO_2$ and aluminoxane in an inert solvent, under an inert atmosphere, preferably argon or nitrogen, and under anhydrous conditions. Such reaction conditions are well known. Suitable inert solvents include aliphatic or aromatic organic solvents.

Use of aliphatic solvents is generally preferred in the preparation of component (c) of the invention, since these solvents are generally readily removed from the final polymerization product by devolatilization. Aromatic solvents, such as toluene, benzene, and the like, can also be used in the preparation of component (c) of the invention, they are not generally preferred.

A wide range of liquid aliphatic hydrocarbons can be used as solvents, including mixtures of such hydrocarbons. This known class of compounds includes, for example, pentane, hexane, heptane, isopentane, cyclohexane, methylcyclohexane, isooctane, and the like, and mixtures of thereof, such as commercial blends of $C_8$ to $C_{10}$ alkanes sold under the tradename Isopar E by Exxon Chemical Co. Most preferably, the solvent for making component (c) of the invention is n-heptane.

While the order of addition of the $SiO_2$ and aluminoxane and solvent is not thought to be critical in preparing component (c), it is generally preferred to add the aluminoxane to a slurry of $SiO_2$ in the inert solvent. It is also preferred that the $SiO_2$ and aluminoxane mixture be stirred throughout the reaction in order to expedite the reaction process by providing and maintaining an intimate contact between the reactants.

The reaction between $SiO_2$ and aluminoxane in making component (c) of the invention may be performed at temperatures between about $-20°$ C. and about $120°$ C., preferably between about $0°$ C. and about $100°$ C., more preferably between about $20°$ C. and about $80°$ C., and most preferably between about $40°$ C. and about $70°$ C., all preferably at about atmospheric pressure. The time of the reaction between $SiO_2$ and aluminoxane may be from about 15 minutes (min) to about 24 hours, preferably from about 30 min to about 12 hours, more preferably from about 1 hour to about 8 hours, and most preferably from about 2 hours to about 4 hours, in accordance with the conditions of temperature and pressure set forth above.

While it is most preferred that the $SiO_2$ of component (c) is reacted with an aluminoxane to remove all the surface hydroxyl groups, less than full dehydroxylation of the $SiO_2$ is operable in the product and process of the invention; however, the resulting supported catalyst is expected to operate at less than optimal efficiencies, and thus is not desired.

The supported organometallic catalyst compositions of the present invention are readily prepared by combining and reacting component (a), component (b) and component (c), in any order, after which the catalyst composition thereby obtained is introduced into a polymerization reactor vessel. Thus, component (a) may first be reacted with component (b), and component (c) is subsequently added to the reaction product of components (a) and (b). Alternatively, component (a) may be added to a mixture of components (b) and (c), and the resultant product of the reaction between components is added to the polymerization reactor. Preferably, component (a) is first reacted with component (c), and the reaction product is then mixed with the activator component (b), and the resultant activated, supported catalyst composition is added to the polymerization reactor. In general, the catalyst composition of the invention can be prepared by combining components (a), (b) and (c) in a suitable solvent or diluent, typically a mixture of $C_8$ to $C_{10}$ saturated hydrocarbons (e.g., Isopar E made by Exxon) at a temperature within the range of $-100°$ C. to $+100°$ C., preferably from about $0°$ C. to about $80°$ C., and more preferably from about $20°$ C. to about $60°$ C. After the addition of all three components to the reaction medium, the resulting activated, supported catalyst composition may be isolated as a solid from the reaction mixture, such as by filtration. The isolated, activated, supported catalyst composition may then be added to the polymerization reactor, if so desired, especially for gas phase polymerization processes.

It has been found that the composition of component (a) and component (c) is surprisingly stable. For example, such a composition has been found to be essentially fully activatable by component (b) up to about one month after the mixing of components (a) and (c). Such a stability represents another advantage of the present invention, in that a batch mixture of components (a) and component (c) can be initially made, and shipped if necessary, and later be made into the active catalyst compositions of the invention. As such, the processes using the activated, supported catalyst compositions of the invention are expected to be more reproducible from batch to batch than was heretofore attainable.

In addition, a mixture of the activated, supported catalyst composition containing all three components, or the solid, supported, activated catalyst composition isolated from the reaction mixture after all three components have been added, is also surprisingly stable.

In the practice of the invention, the mole ratio of component (b) to component (a) may be from about 0.1:1 to about 20:1, and preferably from about 1:1 to about 10:1. The mole ratio of Al in component (c) to metal, M, in component (a) may be from about 0.1:1 to about 1000:1, preferably from about 1:1 to about 500:1, and more preferably from about 3:1 to about 100:1.

Hydrogen can be employed in the polymerization of olefins in the practice of the invention to control the chain length of polymers. Generally, the molar ratio of hydrogen to olefin monomer(s) may be from 0 to about 1; preferably from 0 to about 0.1; and, most preferably from 0 to about 0.05.

The polymerization reaction, especially the polymerization of ethylene homopolymers and copolymers in the practice of the present invention in a solution polymerization process, may be conducted under temperatures and pressures in such combinations as to provide acceptable polymerization efficiencies and as well as the desired molecular weight interpolymers. The useful ranges for these processes are readily determined by those skilled in the art.

The solution polymerization, especially the polymerization of ethylene homopolymers and copolymers, may be either a "high pressure" or "low pressure" process. Suitable reactor pressures for a solution polymerization for the above temperature ranges are from about atmospheric pressure to about 1000 psig (6900 kPa), preferably from about 15 psig to about 700 psig (100 kPa to about 4800 kPa), and most preferably from about 200 psig to about 600 psig.

As is readily recognized by those skilled in the art, the useful polymerization reaction temperatures and pressures for slurry polymerization and gas-phase polymerization can be readily determined, and are generally those that are known.

Suitable solvents or diluents in the polymerization reaction include those compounds known to be useful as solvents or diluents in the polymerization of olefins and diolefins. Suitable solvents or diluents include, but are not meant to be limited to, straight and branched chain hydrocarbons, preferably $C_3$ to $C_{10}$ hydrocarbons such as isobutane, butane, pentane, isopentane, hexane, heptane, octane, isooctane, nonane, and the like; and cyclic and alicyclic hydrocarbons such as cyclohexane, cycloheptane, methylcyclohexane, methylcycloheptane and the like.

Suitable solvents or diluents also include liquid olefins which may act as monomers or comonomers in the polymerization reaction, such as ethylene, propylene, butene, cyclopentene, 1-hexene, 3-methyl-1-pentene, 4-methyl-1-pentene, 1-octene, 1-decene, styrene, and the like.

The polymerization reaction may be performed by any of the conventional, continuous processes employing Ziegler catalysts. These include single phase systems wherein the single phase is primarily the principal monomer or an inert diluent. Alternatively, a two-phase polymerization system may be employed where the liquid phase is primarily the principal monomer or an inert diluent. The catalyst compositions of this invention are particularly suitable for slurry polymerization reaction systems.

In a preferred embodiment, the catalyst composition of the invention is used either to homopolymerize ethylene or to copolymerize ethylene (the most preferred principal monomer) with α-olefin comonomers having from 3 to about 20 carbon atoms, preferably from about 3 to about 18 carbon atoms, more preferably from about 3 to about 12 carbon atoms, and most preferably from about 3 to about 10 carbon atoms, including styrene, thereby yielding a copolymer. Copolymers of propylene with either ethylene, with either as principal monomer or on an equimolar basis, or copolymers with propylene as principal monomer and $C_4$ to $C_{20}$, preferably $C_4$ to $C_{18}$, more preferably $C_4$ to $C_{12}$ and most preferably $C_4$ to $C_{10}$, alpha-olefin comonomers are also preferred.

As would be readily apparent to those skilled in the art, polyolefin copolymers comprising more than two chemically distinct monomeric units (e.g., terpolymers, etc.) may also be conveniently made in the practice of the invention. It is therefore to be understood that "copolymer", as used herein, is meant to include any polymer comprised of two or more chemically distinct monomeric units.

Surprisingly, the supported organometallic catalyst composition of the invention is much more efficient at incorporating long chain olefin monomers into a polymer or copolymer than previously known polyolefin catalysts. Thus the present catalyst compositions incorporate olefin monomers greater than $C_7$ at an efficiency that is substantially independent of monomer chain length. For example, the catalyst compositions of the invention incorporate either hexene or octene comonomers with ethylene principal monomer at a substantially higher rate (e.g., up to a four-fold rate increase or more) than do known polyolefin catalyst complexes or compositions. Additionally, it has been found that octadecene-1 ($C_{18}$) monomers can be efficiently incorporated into polyethylene copolymers. As one result of the greater efficiency of long chain monomer into a copolymer, the present invention unexpectedly allows for the production of homogeneous polyethylene copolymers containing up to about 30 mole percent of long chain comonomer. Such a high reactivity is surprising, since it would be expected that reacting the organometallic catalyst complex to a silica-aluminoxane reaction product support would substantially impair the ability of the catalyst to react with long-chain comonomers and produce homogeneous polymer and copolymer products. As described herein, however, this was found not to be the case in the practice of the present invention.

The supported organometallic catalyst compositions of the present invention unexpectedly have extended lifetimes. Catalyst lifetimes of up to about four hours have been observed. This is in great contrast to the lifetime of previously known supported organometallic polymerization catalysts, which are generally on the order of less than 10 minutes. The present supported catalyst composition is, therefore, advantageous over those previously known, particularly for in use in continuous polymerization processes, since less of the present catalyst is required under similar reaction conditions. Given the relatively large expense of the components of known organometallic catalyst complexes, the present catalyst composition is thus more economical to use than those previously available.

Measurement of the polydispersity of the polymer product made using the catalyst of the invention is done essentially according to the following technique.

The polymers are analyzed by gel permeation chromatography, for example on a Waters 150 C. high temperature chromatographic unit equipped with three linear mixed bed columns (Polymer Laboratories; 10 micron particle size), operating at a temperature of about 140° C. The solvent for GPC analysis is typically 1,2,4,-trichlorobenzene, from which about 0.5% by weight solutions of the samples are prepared for injection. The flow rate is typically set at about 1.0 mL/min and the volume of injected material is typically about 100 µL.

The molecular weight determination of the polymer product of the invention is deduced by using narrow molecular weight distribution polystyrene standard, such as those available for Polymer Laboratories, as a function of their elution volumes. The equivalent polyethylene molecular weights are then determined by using appropriate Mark-Houwink coefficients for polyethylene and polystyrene, as described by Williams and Ward in *Journal of Polymer Science*, Polymer Letters, Vol. 6, 621, (1968) to derive the equation:

$$M_{PE} = aM_{PS}^b$$

where $M_{PE}$ is the polyethylene number average molecular weight, $M_{PS}$ is the polystyrene number average molecular weight, a=0.4316 and b =1.0. The weight average molecular weight is then calculated in the usual manner, as is known to the skilled person in the art.

Density of the ethylene homopolymers and copolymers made using the catalysts of this invention is conveniently measured in accordance with ASTM D-792 and is typically reported in units of g/cm³. The catalyst compositions of this invention can make ethylene copolymers having a density in the range from about 0.85 to about 0.96 g/cm³.

The supported organometallic catalyst compositions of the present invention can be used to produce homogeneous polymers, copolymers, terpolymers, etc. in either solution processes, gas-phase processes, or slurry processes and thereby is readily applicable to existing technologies for the production of polyolefins, especially ethylene homopolymers and ethylene/alpha-olefin copolymers.

In practicing the invention, the polymer products may be produced by a continuous polymerization process in a suitable polymerization reactor, and they can also be produced in a reactor system having multiple reactors (generally connected in series) at a polymerization temperature and pressure sufficient to produce polymers having the desired properties. According to one preferred embodiment, the catalyst compositions of this invention can be used to produce a polymer product in a continuous process, as opposed to a batch process. Such polymer product, when produced in a continuous polymerization process using the catalyst compositions of the present invention, especially when used in a continuous solution polymerization process, may have long chain branching, as described in U.S. Pat. No. 5,272,236.

In practicing the invention, the polymer products may be produced by a continuous polymerization process in a suitable polymerization reactor, and they can also be produced in a reactor system having multiple reactors (generally connected in series) at a polymerization temperature and pressure sufficient to produce polymers having the desired properties. According to one preferred embodiment, the catalyst compositions of this invention can be used to produce "substantially linear olefin polymers" as described in U.S. Pat. No. 5,272,236 and U.S. Pat. No. 5,278,272. The term "substantially linear olefin polymer" means that the polymer backbone is substituted with 0.01 long chain branches/1000 carbons to 3 long chain branches/1000 carbons, more preferably from about 0.01 long chain branches/1000 carbons to 1 long chain branches/1000 carbons, and especially from 0.3 long chain branches/1000 carbons to 1 long chain branches/1000 carbons. When the catalyst compositions of this invention are used in a continuous polymerization process, especially when used in a continuous solution polymerization process, the resulting polymer products may have such long chain branching, as described in U.S. Pat. No. 5,272,236 and U.S. Pat. No. 5,278,272.

The polyolefins produced by the catalyst compositions o this invention, especially ethylene homopolymers and copolymers, may be used to prepare fabricated articles using conventional polyolefin processing techniques. Useful fabricated articles include those such as films (e.g., cast, blown and extrusion coated), fibers (e.g., staple fibers, spunbond fibers or melt blown fibers) and gel spun fibers, both woven and non-woven fabrics (e.g., spunlaced fabrics), and articles made from blends of such fibers, as well as molded articles made, for example, by conventional injection molding, blow molding and rotomolding processes.

In order that persons skilled in the art may better understand the practice of the present invention, the following examples are provided by way of illustration, and not by way of limitation. Additional information which may be useful in state-of-the-art practice may be found in each of the references and patents cited herein, which are hereby incorporated by reference.

EXAMPLE 1

A. Preparation of (Tert-butylamido)dimethyl(tetramethyl-$\eta^5$-cyclopentadienyl)silanetitanium dimethyl Catalyst Complex.

In a drybox, 4.0 mL of 2.0M isopropylmagnesium chloride in diethyl ether was syringed into a 100 mL flask. The ether was removed under reduced pressure to leave a colorless oil. 20 mL of a 4:1 (by volume) toluene:tetrahydrofuran (THF) mixture was added followed by 0.97 g of (tert-butylamino)dimethyl(tetramethylcyclopentadienyl) silane. The solution was heated to reflux. After 8–10 hours, a white precipitate began to form. After refluxing for a total of 27 hours, the solution was cooled and the volatile materials were removed under reduced pressure. The white solid residue was slurried in pentane and filtered to leave a white powder (1.23 g, 62% yield) of [Me$_4$C$_5$SiMe$_2$N-t-Bu] Mg$_2$Cl$_2$(THF)$_2$ (where Me is methyl, t-Bu is tertiary butyl and THF is tetrahydrofuran).

In the drybox, 0.10 g of TiCl$_3$(THF)$_3$ was suspended in 40 mL of THF. 0.138 g of solid [Me$_4$C$_5$SiMe$_2$N-t-Bu]Mg$_2$Cl$_2$(THF)$_2$ was added, resulting in a color change from pale blue to deep purple, signifying the formation of the complex (tert-butylamido)dimethyl(tetramethyl-$\eta^5$cyclopentadienyl) silanetitanium chloride. After stirring for 5 minutes, 0.17 mL of a 1.56M solution of methylene chloride in tetrahydrofuran was added. The color changed to bright yellow. After several minutes the THF was removed under reduced pressure. The product was recovered by extraction in pentane.

The yield was 70 percent. The identity of the product was confirmed as (tert-butylamido)dimethyl(tetramethyl-$\eta^5$-cyclopentadienyl) silanetitanium dichloride by $^1$H NMR, ($C_6D_6$): 1.992 (s), 1.986 (s), 1.414 (s), 0.414 (s).

In an inert atmosphere box, 9.031 g of (tert-butylamido) dimethyl(tetramethyl-$n^5$-cyclopentadienyl)silanetitanium dichloride is charged into a 250 mL flask and dissolved into 100 mL of THF. To the solution is added 35 mL of a 1.4M methylmagnesium bromide solution in toluene/THF. The reaction mixture is stirred for 20 min followed by removal of the solvent under vacuum. The resulting solid is dried under vacuum for several hours. The product is extracted with pentane and filtered. The pentane is removed from the filtrate under vacuum leaving the complex as a yellow solid.

B. Preparation of Borane Activator, Tris (pentafluorophlenyl)borane.

The borane activator (component (b)) was prepared by the reaction of the Grignard reagent $C_6F_5MgBr$ with $BF_3$ etherate in diethylether. After the reaction was complete, the ether solvent was removed under vacuum, the product extracted with Isopar E, the extracts filtered to yield a solution of the borane for use as component (b).

C. Preparation of Silica-Aluminoxane

A 500 mL flask was charged with 5.0 g of $SiO_2$ (Davison SYLOID 245), which had been dehydroxylated in a fluidized bed in nitrogen at 600° C. for 12 hours. A volume of hydrocarbon solvent, Isopar E, was then added to the silica to generate a slurry. A sample of 20 mL of a 6.2 weight percent solution of modified methylaluminoxane (Akzo Nobel) in heptane was slowly added to the slurry by syringe over the course of about 5 minutes. The resultant mixture was heated at about 75° C. for about 3 hours under nitrogen, followed by cooling to room temperature.

The flask was next transferred to an inert atmosphere box (nitrogen atmosphere) and the solid in the flask collected on a medium porosity fritte and washed with Isopar E. After drying under nitrogen gas, the resultant white solid was transferred to an 8 oz. bottle and suspended in about 250 mL Isopar E solvent. The suspension was found to contain a silica concentration of 20 g/L and an aluminum content of 0.100M. The ratio of aluminum to silica in the sample was determined to be 5.0 mmole/g (Al:$SiO_2$).

D. Formation of the Supported Catalyst Complex

The (tert-butylamido)dimethyl(tetramethyl-$\eta^5$-cyclopentadienyl)silane dimethyltitanium complex was dissolved in Isopar E to give a clear solution of Ti concentration of 5 mM. Fifty mL of this solution (0.25 mmole Ti) was added to 150 mL of the above-described slurry of silica-aluminoxane in a 16 oz. bottle and the solution was stirred for about 70 hours. The supernatant fluid was decanted from the solids to remove any unsupported compounds. The solids were then resuspended in 65 mL of Isopar E. The solids were determined to contain 0.054 mmole Ti/g $SiO_2$.

E. Catalyst Activation

A sample of the above reaction mixture containing 0.005 mmol Ti was transferred to a 4 oz bottle. The slurry was treated with 2.0 mL of component (b) from above (0.020 mmol component (b)) for 2 minutes at 25° C. with stirring, and the reaction product containing the activated, supported catalyst composition slurried in the liquid hydrocarbon was transferred by syringe to the catalyst injection port on a batch polymerization reactor.

EXAMPLE 2
Solution Polymerization

A stirred, one gallon (3.79 L) autoclave reactor was charged with two liters of Isopar E and 175 mL of octene-1, before heating to reaction temperature. The reactor was then charged with 4 mmol hydrogen gas followed by ethylene sufficient to bring the total pressure in the reactor to 450 psig. The slurry of the activated catalyst composition, as prepared in Example 1, was next injected into the reactor. The reaction temperature and pressure were kept essentially constant at 120° C. and 450 psig, by continually feeding ethylene during the polymerization reaction and cooling the reactor as necessary. The rate and duration of the reaction were monitored by measuring the demand flow of ethylene to the reactor for the polymerization. The yield was about 235 g polyethylene (47,000 g polyethylene/mmol Ti added to the reactor) based on the amount of polymer isolated from the polymerization solution. The copolymer had a melt index of 3.4, an $I_{10}/I_2$ ratio of 6.5, and a density of 0.9084 g/cc.

EXAMPLE 3
Slurry Polymerization

A 5 L autoclave reactor was charged with about 1850 g anhydrous hexane with stirring and the reactor contents heated to about 85° C. The reactor pressure was then increased by 5 psig by the addition of hydrogen gas to the reactor headspace, followed by a sufficient quantity of ethylene to raise the total pressure to 175 psig. A sample of activated catalyst composition containing about 0.002 mmol Ti, prepared essentially according to Example 1, was next added to the reactor through a pressurized addition cylinder. Ethylene was supplied to the reactor continuously using a demand feed regulator on the feed line. After about 45 minutes, the ethylene was blocked in and the reactor vented and cooled. The reactor contents were padded to a filter system where the polymer was removed from the hexane and dried under vacuum overnight. The yield of free-flowing, granular polyethylene thus obtained weighed 38.4 g and the product showed a melt flow rate ($I_2$) of 0.70 g/10 min and a melt flow rate ($I_{10}$) of 4.68 g/10 minutes.

EXAMPLE 4
A. Catalyst Preparation

The organometallic complex and borane activator were prepared essentially as set forth in the Example above. The supported catalyst was prepared as follows:

A 500 mL flask was charged with about 50 mL of toluene and about 5.0 g of $SiO_2$ (Davidson SYLOID 245), that had been dehydroxylated at about 600° C. for about 12 hours in a fluidized bed under nitrogen. Fifty mL of methylaluminoxane (0.991M aluminum; 50 mmol Al) were slowly added by syringe into the slurry with stirring. The resultant mixture was then heated for about 3 hours at 60° C. under a nitrogen atmosphere, after which the mixture was cooled to room temperature. The flask was then transferred to an inert atmosphere box (nitrogen) and the solid collected on a medium porosity fritte and washed 3 times with 30 mL toluene followed by 5 washes with Isopar E. After drying under nitrogen, the white solid was transferred to an 8 oz. bottle and suspended in about 200 mL Isopar E. The suspension was determined to contain silica at about 25 g/L and the aluminum content was found to be about 0.063M.

A sample of the above reaction mixture containing a known amount of aluminum was transferred to a 4 oz. bottle. The slurry was treated with an Isopar E solution of catalyst complex (component (a)) containing a specified amount of Ti and component (c) containing a specified amount of borane. The activation reaction was carried out essentially as described above, after which the reaction product was transferred by syringe to the catalyst injection port on the polymerization reactor.

EXAMPLES 5 to 15
Solution Polymerizations

The solution polymerizations were carried out essentially as described in Example 2 above, with the exception that the reactor was charged with 150 mL octene-1 and 10 mmol hydrogen, and the components in Example 4 were used. Table 1 summarizes the polymerization reaction conditions and certain characteristics of the polyethylene product obtained. Additionally, in reaction 12, the reactor was charged with 300 mL octene-1 and no hydrogen was added, and in Example 13, only 4 mmol of hydrogen was charged into the reactor. Furthermore, in Example 14 the supported catalyst complex was (tert-butylamido)dimethyl(tetramethyl-$\eta^5$-cyclo-pentadienyl)silane dibenzyltitanium. In Example 15, the supported catalyst complex the tetrahydroindenyl derivative ($C_9H_{10}$—$Me_2Si$—N-t-Bu)Ti($CH_3$)$_2$.

Example 6 is a comparative example without a boron containing activator (i.e., component (b) is absent) and no polymer was produced. The absence of the containing activator shows that component (c) in itself is insufficient in combination with component (a) alone to form an active catalyst composition.

3 hours under nitrogen, and subsequently cooled to room temperature. The flask was transferred to an inert atmosphere (nitrogen) box and the solid collected on a medium porosity fritte and washed with Isopar E. After drying under nitrogen, the white solid was transferred to an 8 oz. bottle and suspended in about 250 mL Isopar E solvent. The suspension was determined to contain a silica concentration of about 20 g/L and an aluminum content of about 0.065M. The ratio of aluminum to silica in the sample was about 3.0 mmol Al/g $SiO_2$.

Catalyst Activation. A sample of the preceding $SiO_2$-aluminoxane reaction product containing a known amount of Al was transferred to a 4 oz. bottle. The slurry was treated with an Isopar E solution of component (a) containing a specified amount of Ti and component (b) containing a specified amount of borane. The activated, supported organometallic catalyst complex was transferred to a polymerization reactor via syringe injection through a catalyst injection port.

TABLE 1

| Example No. | Reactor Temp. (°C.) | Ti (mmol) | B (mmol) | Al (mmol) | Yield (g) | $I_2$ | $I_{10}/I_2$ | Density (g/cc) |
|---|---|---|---|---|---|---|---|---|
| 5  | 120 | 5 | 10 | 63  | 176 | 2.76 | 6.14 | 0.9121 |
| 6  | 120 | 5 | 0  | 63  | 0   | NA   | NA   | NA     |
| 7  | 120 | 5 | 10 | 32  | 135 | 5.97 | 5.85 | 0.9094 |
| 8  | 120 | 5 | 10 | 95  | 278 | 5.82 | 6.12 | 0.9099 |
| 9  | 120 | 5 | 10 | 126 | 345 | 6.69 | 6.30 | 0.9083 |
| 10 | 120 | 5 | 10 | 158 | 325 | 7.26 | 6.21 | 0.9090 |
| 11 | 120 | 5 | 10 | 126 | 260 | 6.43 | 6.41 | 0.9062 |
| 12 | 120 | 5 | 10 | 126 | 310 | 5.61 | 7.35 | 0.8785 |
| 13 | 120 | 5 | 10 | 126 | 288 | 2.60 | 6.74 | 0.9048 |
| 14 | 120 | 5 | 10 | 126 | 212 | 2.97 | 6.03 | 0.9077 |
| 15 | 120 | 5 | 10 | 126 | 233 | 1.51 | 6.94 | 0.8882 |

NA = Not Applicable

EXAMPLE 16
Catalyst Preparation

Solutions of the Ti organometallic complex component (a) and the borane activator component (b) were prepared essentially as described in Example 1.

Component (c). A 500 mL flask was charged with 5.0 g $SiO_2$ (Davison 952 Silica, dehydroxylated at about 600° C. for greater than 18 hours) and 50 mL Isopar E. To this stirred slurry was added slowly by syringe 20 mL of a 6.2 weight percent solution of modified methylaluminoxane (Akzo Chemical) in heptane dissolved in 30 mL Isopar E. The resulting mixture was next heated at about 75° C. for about

EXAMPLES 17 to 19
Solution Polymerizations

The following polymerizations were conducted according to the procedure set forth in Example 2, with the exception that the reactor was charged with 150 mL octene and the components in Example 16 were employed. The reaction conditions and characterization of the ethylene-octene copolymers produced are summarized in Table 2.

TABLE 2

| Example No. | Reactor Temp. (°C.) | Ti (mmol) | B (mmol) | Al (mmol) | Yield (g) | $I_2$ | $I_{10}/I_2$ | Density (g/cc) |
|---|---|---|---|---|---|---|---|---|
| 17 | 140 | 5 | 10 | 65 | 102 | 2.44 | 5.79 | 0.9085 |
| 18 | 140 | 5 | 10 | 65 | 65  | 1.44 | 5.65 | 0.9124 |
| 19 | 140 | 5 | 10 | 65 | 110 | 1.90 | 5.93 | 0.9093 |

EXAMPLE 20
Catalyst Preparation

Solutions of the Ti organometallic complex component (a) and the borane activator component (b) were prepared essentially as described in Example 1.

A 100 mL flask was charged with 1.0 g of SiO$_2$ (Davison Syloid 245, dehydroxylated at 600° C.) and 20 mL of Isoparaffin 2025 (an isoparaffinic hydrocarbon solvent available from Shell Chemical). Five mL of MMAO in heptane 8.6 wt % Al, Modified Methylaluminoxane from Akzo, Type 3A) dissolved in 10 mL of Isoparaffin 2025 was added slowly, by syringe, to the stirred SiO$_2$ slurry. The mixture was heated to 75° C. for 3 hours then cooled to room temperature and allowed to stir overnight. The solid was collected on Whatman 541 filter paper and washed with an additional 10 mL of Isoparaffin 2025. The solid was not taken to complete dryness. The wet solid was transferred to a 4 oz. bottle and suspended in 50 mL of Isoparaffin 2025.

Ten mL of this solution of component (a) was added to the silica slurry and the mixture was stirred for 48 hours. After this time, the slurry was allowed to settle and the supernatant was removed from the solids using a pasteur pipette. The solids were reconstituted to a total volume of 50 mL with Isoparaffin 2025.

The catalyst was activated by adding a solution of component (b) containing 0.2 mmol of (F$_5$C$_6$)$_3$B to the slurry and stirring vigorously overnight.

EXAMPLE 21
Gas Phase Polymerization

A one-liter cylindrical reactor specifically designed for gas phase polymerizations was charged with 30 g of Teflon powder (450 micron) to act as a support bed. The reactor was then sealed and placed under vacuum at 90° C. for 18 h. The reactor was cooled to 70° C. and filled with nitrogen to a pressure of 20 psig. The Teflon bed was agitated at about 400 rpm and a 4 mL volume of 0.050M MMAO in heptane was injected into the reactor by syringe. After about one minute, 1.5 cc of the activated catalyst of Example 20 was injected into the reactor from a syringe. Ethylene was then slowly added to the reactor to give an ethylene partial pressure of 200 psig and the pressure maintained at the total pressure by feeding ethylene on demand. After 3 hours, the ethylene was blocked in and the reactor and its contents cooled to room temperature. The granular polyethylene product was removed from the reactor and weighed, giving a yield of 52.4 g of polyethylene. The product was analyzed by GPC and found to have an Mn value of 1,320,000.

EXAMPLE 22
Catalyst Preparation

A. Preparation of (Tert-butylamido)dimethyl(tetramethyl-η$^5$-cyclo pentadienyl)silane2-(dimethylamino)benzyl titanium(III) Catalyst Complex The complex (tert-butylamido)dimethyl(tetramethyl-η$^5$cyclo pentadienyl) silanetitanium(III) chloride was prepared in tetrahydrofuran according to Example 1. This complex was treated with one equivalent of the lithium salt of dimethylaminotoluene at room temperature for 30 minutes. The solvent was evaporated and the solid residues extracted with pentane and the extracts filtered to remove salt by-products. The pentane solvent was removed from the extract filtrate to yield the desired titanium(III) complex.

B. Preparation of the Supported Catalyst Complex

A supported catalyst complex was prepared substantially as in Example 1 except that the silica had been dehydroxylated at 800° C. for 8 h and the titanium(III) complex above was used as the organometallic compound. The final catalyst component slurry contained a Ti concentration of 1.25 millimolar.

C. Catalyst Activation

An activated catalyst composition was formed by mixing, in a 4 oz bottle, 3.2 mL of the catalyst component slurry prepared above and 1.2 mL of a solution of the borane activator from Example 1(b) at room temperature for 3 min.

EXAMPLE 23
Solution Polymerization

The catalyst prepared in Example 22 was employed in an ethylene octene-1 copolymerization under solution process conditions similar to those described in Example 2 except that the reactor temperature was maintained at 140° C. during the polymerization. The ethylene-octene-1 copolymer recovered from the polymerization reaction weighed 236 g (59,000 g polyethylene/mmol Ti), had a melt index of 1.2, an I$_{10}$/I$_2$ ratio of 6.8, and a density of 0.9072 g/cc.

EXAMPLE 24
Catalyst Preparation

The titanium complex and the silica-aluminoxane mixture were prepared as described in Example 1. The borate activator mixture was prepared by suspending [N,N-dimethylanilinuim][tetrakis(perfluorophenyl)borate] in Isopar E in an amount of 0.01 moles/liter. The supported catalyst complex prepared in Example 1D was activated by mixing 5.0 mL of the slurry (0.005 mmol B) and stirring at 25° C. for 10 minutes.

EXAMPLE 25
Solution Polymerization

The polymerization was conducted essentially as set forth in Example 2 except that the reaction temperature was kept at 140° C. The yield was about 197 g polyethylene (39,400 g polyethylene/mmol Ti added to the reactor) based on the amount of polymer isolated from the polymerization solution. The polymer had a melt index of 5.8, an I$_{10}$/I$_{12}$ ratio of 7.4, and density of 0.9125 g/cc.

It is to be understood that various other modifications will be apparent to and can be readily made by those skilled in the art without departing from the scope and spirit of this invention. Accordingly, it is not intended that the scope of the claims appended hereto be limited to the description and examples set forth above but rather that the claims be construed as encompassing all of the features of patentable novelty which reside in the present invention, including all those features which would be treated as equivalents thereof by those skilled in the art to which the invention pertains.

What is claimed is:

1. A supported catalyst composition adapted for homopolymerizing ethylene or copolymerizing ethylene with at least one C$_3$ to C$_{20}$ α-olefin monomer to form an ethylene polymer having a narrow molecular weight distribution, said catalyst composition comprising:

(a) an organometallic complex of the formula:

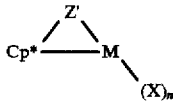

wherein:

M is a metal of Group 4 of the Periodic Table of the Elements,

Cp* is a cyclopentadienyl group bound in an η$^5$ bonding mode to M or such a cyclopentadienyl group substituted with from one to four substituents selected from the group consisting of hydrocarbyl, silyl, germyl, halo, hydrocarbyloxy, amine, and mixtures thereof, said substituent having up to 20 nonhydrogen atoms, or optionally, two substituents together cause Cp* to have a fused ring structure;

Z' is a divalent moiety other than a cyclopentadienyl group or substituted cyclopentadienyl groups, said Z' comprising boron, or a member of Group 14 of the Periodic Table of the Elements, and optionally nitrogen, phosphorus, sulfur or oxygen, said moiety having up to 20 nonhydrogen atoms, and optionally Cp* and Z' together form a fused ring system;

X independently each occurrence is an anionic ligand group having up to 50 non-hydrogen atoms and X is not a cyclopentadienyl or substituted cyclopentadienyl group; and n is 1 or 2 depending on the valence of M;

(b) a compound or complex other than an aluminoxane which converts the organometallic complex (a) into a cationic complex of the formula:

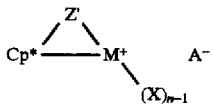

wherein:

Cp*, Z', M, X, and n are as defined with respect to the formula of the organometallic complex in (a) above, and A− is a monovalent, noncoordinating, compatible anion, and (c) an inert, catalyst support in contact with the organometallic complex of (a) and the compound or complex of (b), said catalyst support comprising silica reacted with an aluminoxane.

2. The catalyst composition of claim 1 wherein the organometallic complex of (a) corresponds to the formula:

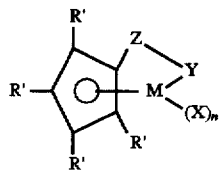

wherein:

M is a Group 4 metal,

Each occurrence of R' is independently selected from the group consisting of hydrogen, alkyl, aryl, silyl and combinations thereof having up to 20 nonhydrogen atoms and two or more R' together can join together to create a fused ring structure with the cyclopentadienyl structure of the above formula;

Each occurrence of X is independently selected from the group consisting of hydride, alkyl, aryl, silyl and combinations thereof, having up to 20 nonhydrogen atoms;

Y is a divalent ligand group comprising NR* or PR*, said Y being bonded both to Z and M;

Z is SiR*$_2$, CR*$_2$, SiR*$_2$SiR*$_2$, CR*$_2$CR*$_2$, CR*=CR*, CR*$_2$SiR*$_2$, or BR*;

Each occurrence of R* is independently selected from the group consisting of hydrogen, alkyl, aryl, silyl, halogenated alkyl, halogenated aryl groups having up to 20 nonhydrogen atoms, and mixtures thereof, or two or more R* groups from Y, Z, or from Z together with Y forms a fused ring system;

n is 1 or 2.

3. The catalyst composition according to claim 2 wherein M is titanium.

4. The catalyst composition according to claim 3 wherein each occurrence of X is a C$_{1-20}$ hydrocarbyl group.

5. The catalyst composition according to claim 4 wherein R' and R* are independently a C$_1$–C$_{12}$ hydrocarbyl group.

6. The catalyst composition according to claim 5 wherein compound or complex (b) is a borane or a borate.

7. The catalyst composition according to claim 6 wherein compound or complex (b) is tris(perfluorophenyl)borane.

8. The catalyst composition according to claim 6 wherein the aluminoxane is methylaluminoxane.

9. The catalyst composition according to claim 6 wherein said aluminoxane is modified methylaluminoxane.

10. A process for polymerizing ethylene or ethylene with at least one C$_3$–C$_{20}$ alpha-olefin comprising contacting the ethylene or ethylene with at least one C$_3$–C$_{20}$ alpha-olefin with a catalyst composition according to any of claims 1–9 under polymerization reaction conditions to polymerize the ethylene or ethylene with at least one C$_3$–C$_{20}$ alpha-olefin, and recovering the resulting polymer.

11. A process for preparing a supported catalyst composition, the process comprising the steps of:

(a) preparing an organometallic complex of the formula:

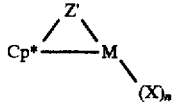

wherein:

M is a metal of Group 4 of the Periodic Table of the Elements,

Cp* is a cyclopentadienyl group bound in an η$^5$ bonding mode to M or such a cyclopentadienyl group substituted with from one to four substituents selected from the group consisting of hydrocarbyl, silyl, germyl, halo, hydrocarbyloxy, amine, and mixtures thereof, said substituent having up to 20 nonhydrogen atoms, or optionally, two substituents together cause Cp* to have a fused ring structure;

Z' is a divalent moiety other than a cyclopentadienyl group or substituted cyclopentadienyl groups, said Z' comprising boron, or a member of Group 14 of the Periodic Table of the Elements, and optionally nitrogen, phosphorus, sulfur or oxygen, said moiety having up to 20 nonhydrogen atoms, and optionally Cp* and Z' together form a fused ring system;

X independently each occurrence is an anionic ligand group having up to 50 non-hydrogen atoms and X is not a cyclopentadienyl or substituted cyclopentadienyl group; and n is 1 or 2 depending on the valence of M;

(b) reacting the organometallic complex of (a) with a compound or complex other than an aluminoxane which converts the organometallic complex of (a) into a cationic complex of the formula:

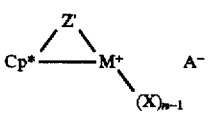

wherein:

Cp*, Z', M, X, and n are as defined with respect to previous formula I, and

A− is a monovalent, noncoordinating, compatible anion, and (c) contacting the cationic complex of (b) with a catalyst support comprising silica reacted with an aluminoxane.

* * * * *